(12) United States Patent  
Yarbrough et al.

(10) Patent No.: US 7,246,406 B2
(45) Date of Patent: Jul. 24, 2007

(54) DUST COLLECTION SYSTEM

(76) Inventors: Glen Allen Yarbrough, 494 Deer Ridge La., Nashville, TN (US) 37221; Chad Eric Usherwood, 7125 Lenox Village Dr., Nashville, TN (US) 37211

( * ) Notice: Subject to any disclaimer, the term of this patent is extended or adjusted under 35 U.S.C. 154(b) by 230 days.

(21) Appl. No.: 10/957,949

(22) Filed: Oct. 4, 2004

(65) Prior Publication Data

US 2005/0071947 A1 Apr. 7, 2005

Related U.S. Application Data

(60) Provisional application No. 60/508,475, filed on Oct. 6, 2003.

(51) Int. Cl.
*A47L 9/18* (2006.01)

(52) U.S. Cl. .................. 15/353; 55/DIG. 33; 261/120; 96/351

(58) Field of Classification Search ............ 15/339, 15/347, 353, 415.1; 55/DIG. 3; 95/226; 96/279, 340, 342, 351; 451/453; 261/120
See application file for complete search history.

(56) References Cited

U.S. PATENT DOCUMENTS 131,943 A * 10/1872 DuPuy ................. 261/120
1,466,500 A * 8/1923 Ford ..................... 261/120
3,939,515 A * 2/1976 Platek ................... 15/321
4,241,505 A * 12/1980 Bodycomb et al. ...... 30/390
6,557,261 B1 * 5/2003 Buser et al. ............ 30/124
6,878,050 B2 * 4/2005 Wendt et al. ........... 451/451
2004/0060145 A1 * 4/2004 Hayama et al. ......... 15/339

FOREIGN PATENT DOCUMENTS

| EP | 484894 | * | 5/1992 |
| EP | 551877 A1 | * | 7/1993 |
| JP | 10-128033 | * | 5/1998 |

* cited by examiner

*Primary Examiner*—Terrence R. Till
(74) *Attorney, Agent, or Firm*—Richard L. Huff

(57) ABSTRACT

A system for cutting and cleaning material to be cut. The system is particularly effective for hard materials which produce heavy particles. The system is ideal for cutting green concrete. This invention provides a two-piece device for locating vacuum a hose connection for a circular saw used in cutting concrete. The hose connection is contained in the low, rear part of the lower piece. The invention also proves a vacuum cleaner which passes debris-laden air through water which collects the debris. Water-laden air rising from the water is passed around a first water barrier connected to a float and a second water barrier connected to the top of the container in order to remove entrapped water droplets which may contain debris.

6 Claims, 4 Drawing Sheets

DUST COLLECTION SYSTEM

CROSS-REFERENCE TO RELATED APPLICATIONS

This application claims the benefit of the filing date of Oct. 6, 2003 of provisional application 60/508,475.

STATEMENT REGARDING FEDERALLY SPONSORED RESEARCH OR DEVELOPMENT (Not applicable)

REFERENCE TO SEQUENTIAL LISTING, A TABLE, OR A COMPUTER PROGRAM LISTING APPENDIX SUBMITTED ON A COMPACT DISC (Not applicable)

BACKGROUND OF THE INVENTION

1) Field of the Invention

This invention relates to devices useful in cutting materials which produce high volumes of fine dust and debris, particularly industrial materials, and more particularly concrete, and in collecting dust resulting from that cutting by vacuuming. More particularly, it relates to a circular saw which improves the pick-up of concrete dust by an intake tube of a vacuum cleaner collecting dust produced in the cutting of dust-producing materials, particularly uncured concrete. The invention also relates to an improved vacuum cleaner which is of the type using water as a filtering system.

2) Description of the Related Art

Regarding the technology of concrete cutting there are two basic methods employed. The first, and increasingly most common, is dry cutting. This is done while the concrete slab is still green, which is the state of incomplete curing. The other is wet sawing. This is done when the slab is cut after it is completely cured. This technology requires the continuous flow of water to the cutting blade thereby creating a slurry of water and concrete dust.

The previous method for picking up the dry material is with a dustpan and broom. This is so because high volumes of fine dust has a tendency to clog conventional filter. For large slab cuts this is a very inefficient method of collection. For wet cuts, the slurry is not removed until dried. By then most of the residue is spread to a point that is hard to get up. The prior art is aware of a circular saw having a guard blade for cutting concrete, which saw is connected to a vacuum cleaner. Such a device is taught by U.S. Pat. No. 5,084,972 issued to Waugh Feb. 4, 1992.

Vacuum cleaners in which air carrying debris enters through a flexible intake hose, travels between an outer wall and an inner wall, passes through a layer of water which collects a portion of the debris, passes through at least one filter, and exits the vacuum cleaner are known in the art. Examples of publications teaching such vacuum cleaners are U.S. Pat. No. 5,205,014 issued Apr. 27, 1993 to Yoo and U.S. Pat. No. 5,925,171 issued Jul. 20, 1999 to Pietrobon. While it is assumed that the devices disclosed by these patents work satisfactorily for the intended purpose, it is desirable to make improvements such as decreasing the complexity of the apparatus and the amount of material required to manufacture similar devices.

BRIEF SUMMARY OF THE INVENTION

The present invention is concerned with improvements in the cutting materials producing dust and debris. Of special interest is the cutting of industrial cutting of heavy, hard materials which produce fine, heavy dust. Most particularly, this invention is concerned with the cutting of green concrete. The invention discloses an improved attachment position for a vacuum hose for a circular saw and an improved vacuum system to remove dust from the cutting site.

The attachment site of the vacuum hose on the saw is part of the present invention. This placement is of importance as the larger saw has so much open area around the blade that even with the higher cfm (cubic feet per minute), the dust would not be otherwise picked up effectively. It has been discovered that the best position to put the connection for the intake hose on the blade cover is low and to the rear of the housing. In order to keep the intake hose connection in the same place all the time as it relates to the material which is being cut, the blade cover is constructed of two pieces. The top piece is bolted to the blade housing on the saw and does not move during operation. The bottom piece, however, is fixed onto the upper piece with slotted bolt holes that allow for the bottom piece to stay down near the floor at all times of operation and at whatever height the saw is operating. During normal operation, the operator starts with the blade above the surface of the floor. The operator then pushes a button which actuates a motor that adjusts the level of the saw blade. The operator allows the blade to descend into the floor to whatever depth is required to cut. With this design, the intake hose connection is kept at the same position as it relates to the floor at whatever depth the cut, whether the saw is cutting at 1½" depth or 3" depth, for examples. It also allows for the bottom piece to keep too much airflow from passing under the blade cover. If the bottom part of the cover is too high off of the floor, this will open the housing too much and the vacuum will not pick up correctly. There are two stops on the bottom cover that allow the bottom plate to descend to a certain point. When these stops hit a parallel rail in the saw housing the bottom plate stops and rests just about ⅛" above the floor. This keeps the bottom plate from dragging the along the floor and scratching the floor. The design has proven in practical application to work very well.

The present invention is further directed to a simple vacuum cleaner which does not require outer and inner walls while still removing substantially all of the dust and debris from the vacuumed area and from the air carrying such debris. The vacuum cleaner of this invention contains a single-walled canister, a conventional motor driving conventional impeller blades to create a flow of air, an intake hose for carrying air laden with debris from an area being cleaned by the flow of air, a body of water located at the bottom of the canister, a float resting on the body of water with the intake hose passing through the float, and a filter bag on the outside of the canister to capture any debris remaining in the air flow. While this vacuum cleaner is suitable for general purpose cleaning, it finds particular utility where the dust is heavy and fine. Thus, the vacuum cleaner of this invention in sanding operations of metal objects and in cutting operations for metal, ceramic, and concrete objects. Of particular interest, is the use of the vacuum cleaner of this invention for the cutting of green concrete.

DETAILED DESCRIPTION OF THE INVENTION

Figure 1:
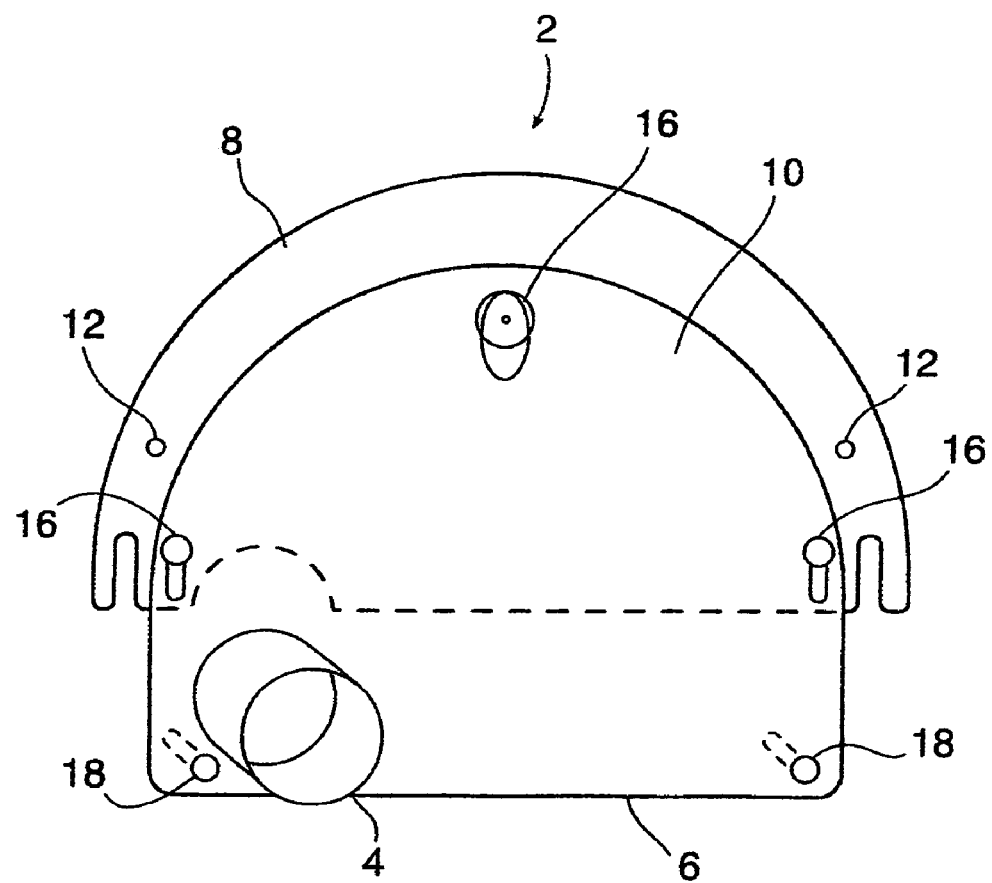
FIG. 1 is an elevational side view of the circular saw of the present invention.

The invention will now be more fully described with reference to the above drawings wherein like numerals refer to like features throughout.

Preferred areas to be cleaned using the device of the present invention are areas where circular saws have been used for the cutting of green concrete. This is so because the debris created by this process is ordinarily difficult to pick up by use of a vacuum and because the debris is easily and substantially completely picked up by the device of the present invention. This device 2 of the present invention is useful for positioning the hose connection 4 on the bottom piece 6 of the device 2. This device 2 is important on the larger saw as the larger saw has so much open area around the blade that even with the higher cfm the dust is not be picked up effectively without this device 2. The inventors have discovered that the best position to put the intake hose connection 4 on the device 2 is low and to the rear of the blade housing 8. The present invention provides a way to keep the intake hose connection 4 in the same place all the time as it relates to the material being cut. To accomplish this, the device 2 is constructed of a top piece 10 and a bottom piece 6. The top piece 10 is bolted to the blade housing 8 on the saw and does not move during operation. The bottom piece 6, however, is fixed onto the top piece 10 with slotted bolt holes 16 that allow for the bottom piece 6 to stay down near the floor at all times of operation and at whatever height the saw is operating. During normal operation the operator starts with the blade above the surface of the floor. The operator then pushes a button which actuates a motor that adjusts the level of the saw blade. The operator allows the blade to descend into the floor to whatever depth is required to be cut. With this design the hose connection 4 is kept at the same position as it relates to the floor regardless of the depth of the uct. It also allows for the bottom piece 6 to avoid allowing too much airflow under the device 2. If the bottom piece 6 of the device 2 is too high off of the floor this will open the housing 8 too much and the debris will not be pick up correctly. There are two stops 18 on the bottom piece 6 that allow the bottom piece 6 to descend to a certain point. When these stops 18 hit a parallel rail, the bottom piece 6 stops and rests just about ⅛" above the floor. This keeps the bottom piece 6 from dragging the ground thereby scratching the floor. The design is proven in practical application to work very well.

The vacuuming device 26 of the present invention contains a number of conventional parts such as a container 28 having a top 30; a bottom 32; a single-walled cylindrical side 34 connecting the top 30 and bottom 32 and having an intake port 36; a motor casing 38 containing a gasoline or electric motor (not shown); an outlet chamber 40 containing impellers 42; means of transporting the container such as wheels 44, a dolly or a cart 46; an intake hose 48 having an intake hose connector 8 and a proximal end 50; an exhaust port 52; and a secondary filtration means such as a filter bag 54. Any suitable intake means 4 may be attached to the distal end 56 to pick up the dust and debris.

The vacuuming device 26 used in the present invention can have a conventional gas or electric motor using a blower-type impeller or a system using an electric motor (not shown) using an impeller 42 similar to the conventional shop vacuum. Basically, the difference between the two is that the blower type units move a great deal of air while having little vacuum pickup power. For example, the gas unit moves 1500 cfm and has pickup power of 7–8 inches of water lift. The electric unit moves about 150 cfm with about 80 inches of water lift. In an application where the vacuum cleaner 26 is attached to a saw 4, a great deal of airflow is needed as opposed to lift power. If the user is picking up particles off of the floor, then lift as opposed to airflow is needed.

Figure 2:
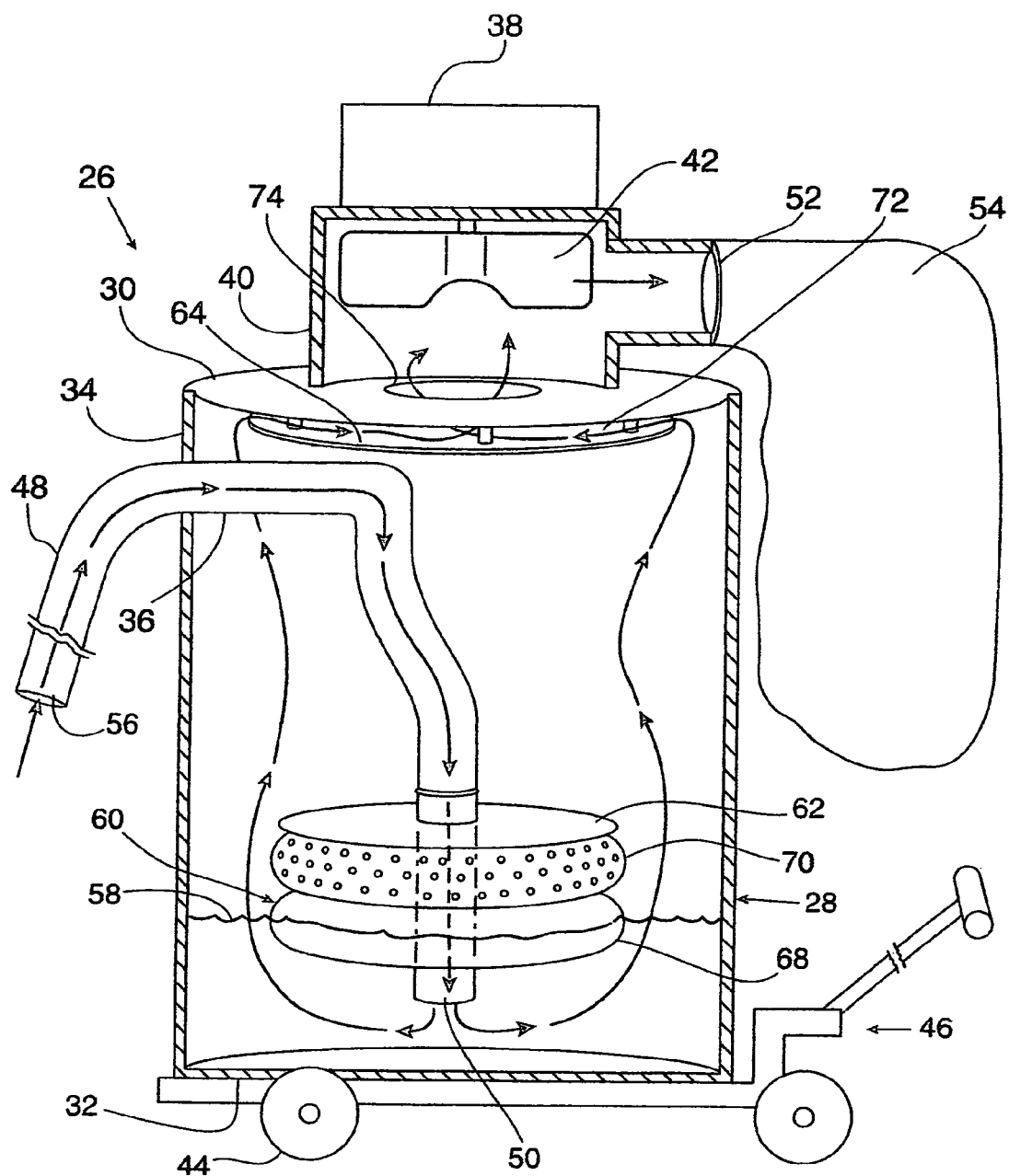
FIG. 2 is a side elevational view in cut-away showing the device of the present invention and the path taken by the flow of air. A secondary filter bag and a cart are shown in this view.
Figure 4:
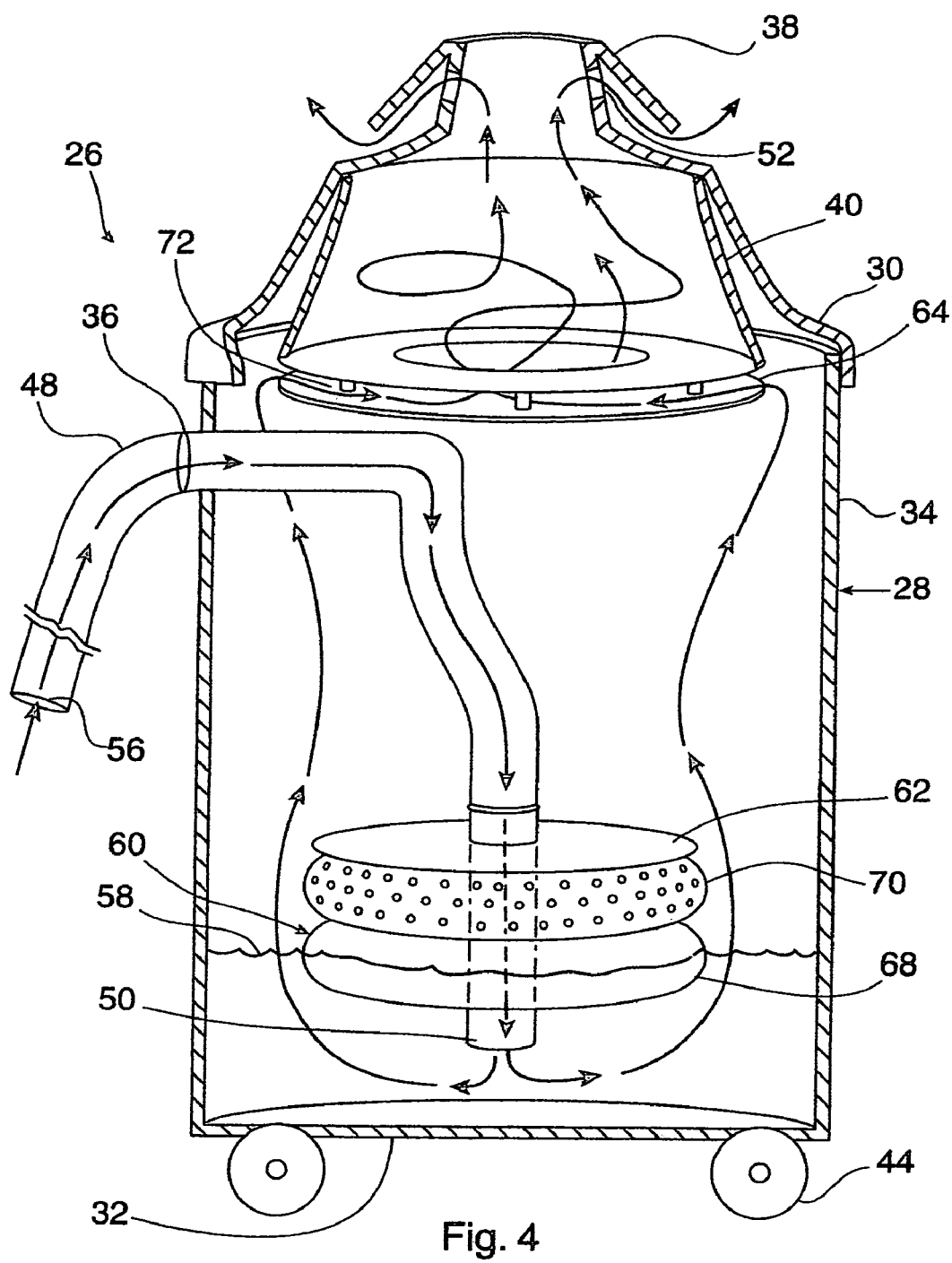
FIG. 4 is a side elevational view in cut-away showing the device of the present invention and the path taken by the flow of air. The secondary filter bag and the cart are omitted from this view.

The vacuuming device 26 employs a primary method of filtration that utilizes water 58 as the filtration medium. While this is effective in cleaning any type of dust and debris, it is less effective when the particles are light, such as house dust or sawdust and is more effective when the particles are heavy, such as metal, ceramic, or concrete. The amount of water 58 used is sufficient to capture substantially all of the debris entering through the intake hose 48. As shown in FIGS. 2 and 4, the intake hose 48 enters the container through the side 34 of the container 28 and is directed vertically downward, passing through a float 60 and having its proximal end 50 in the water 58 or above the water level in the container; whichever is deemed most efficient for the particular application. The water 58 collects substantially all of the debris.

The depth of the intake hose 48 in the water 58 is important. If the intake hose 48 is not far enough under water 58, the water 58 will not filter as much dust. The filter bag 54 then quickly becomes clogged. This causes the vacuuming device 26 to be too impractical for use. The user is then forced to continuously change bags 54 or clean them out which holds up the whole cutting operation. If the intake hose 48 is too far under water 58, the water 58 creates too much resistance to air flow thereby rendering the dust pickup ineffective. It has been found that approximately 3" under water 58 is a perfect balance in one particular configuration.

When dusty air hits the water 58 inside a conventional intake hose, the dust turns into a muddy consistency and then sticks to the inside of the hose. The hose then quickly builds up until it stops the airflow. It has been found that the application of a non-stick surface coating, such as what is similarly used in cookware is coated to the inside of the intake hose 48 which effectively prevents this build-up.

The size of the intake hose 48 is also important. The intake hose 48 must be at least 5" ID with respect to the high cfm model. Anything smaller does not allow enough air to move in order to pick up the dust on larger saws. A 4" hose 48 allows about 450 cfm while a 5" hose 48 allows 1000 cfm.

It can thus be seen that the type of motor and the amount of water lift provided, the size of the intake hose 48, the depth of the intake hose 48 in the water 58 and the size and type of filter bag 54 all have an important bearing on the success of the vacuum device 26 of the present invention. Knowing the effect of each of these factors, one skilled in the art can determine the most ideal variable for a particular function.

Figure 3:
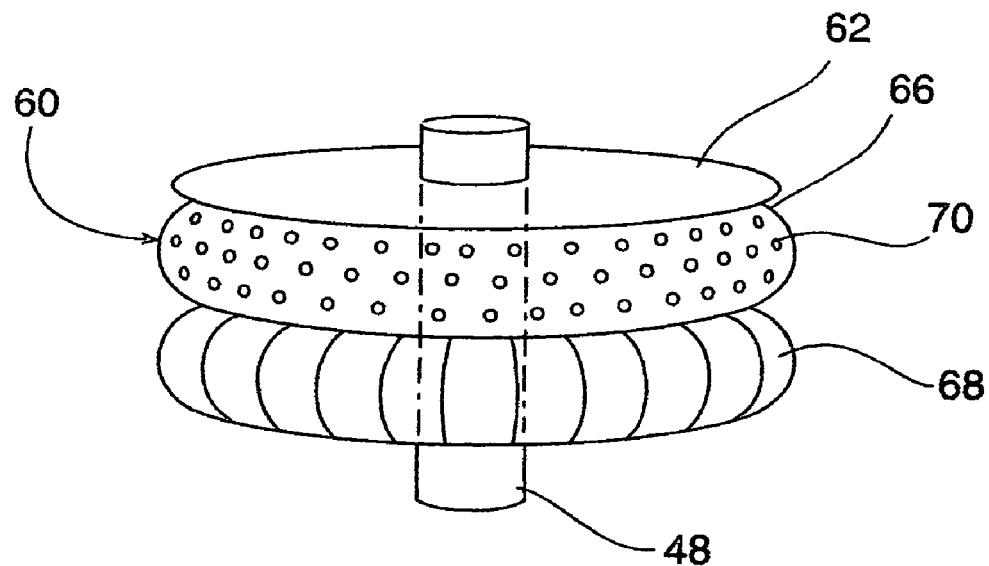
FIG. 3 is an enlarged perspective view of the float which is a key part of the present invention.

FIG. 3 shows the float 60 in detail. As material is brought in and deposited in the water 58, the water level will, of course, change. The float 60 keeps the intake hose 48 at a constant height above the surface of the water 58 or at a constant depth below the surface of the water 58. This is imperative in order to keep a constant level of efficiency throughout the total time of operation. The air rising above the water 58 may still contain some debris entrapped in water droplets. It is thus necessary that the water-laden air be freed of water droplets. This is accomplished by the use of first 62 and second 64 water barriers.

The first water barrier 62 is held on the top surface 66 of a float 60. This float 60 is a major key to the success of this invention. The first, lowermost, section 68 of the float 60 is the float ring 68. This section is filled with air and floats on top of the water 58.

The second, uppermost, section 70 of the float 60 is the float screen 70. The water-laden air passes across the surface of this section 70 causing droplets of air to be deposited inside the section 70. This second section 70 contains a floor (not shown) which is lower at the perimeter and higher at the center to allow deposited water 58 to flow out so that weight is not added to the float 60. This deposited water 58 does not proceed upward in the container 28.

The first water barrier 62 deflects water droplets as they may be propelled upward. It is kept a constant and specific distance from the water surface as it is connected to the float 60 in any suitable known manner.

The function of confining all of the moisture in the container 28 is, in part, accomplished by utilizing the simple float 60 as a holder for the first water barrier 52. The float sections 58, 70 work on the principal of dividing the airflow over a greater surface area so that the velocity slows considerably. Water droplets passing over the float screen 70 will leave the air stream and enter the chamber of the float screen 70. It was discovered by the inventors that by increasing the air flow in a container 28 not having the first water barrier, a problem arose. The extra amount of airflow created more turbulence in the water. The water barrier 64 just below the top 30 of the container would inhibit any turbulence in the container 28 at a lower airflow rate. However, with increased airflow rates, there was a trace of water passing through the drive unit into the secondary filter bag 54. The nature of the secondary filter bag 54 is that if it gets wet, it will no longer allow airflow. With the first, lowermost, water barrier 62 in place there was no water leakage at all, even at the higher cfm.

The air stream containing any remaining water droplets rises through the container 28 and passes between the second water barrier 64 and the top 30 of the container 28. As the air passes along the underside of the second water barrier 64, the air velocity is at a much lower level and the water droplets that may be suspended in the air cannot be held in the air. Therefore the water droplets containing debris fall back into the water 58.

The second water barrier 64 is fixedly connected to the top 30 of the container 28 in such a way that a small space 72 exists between the second water barrier 64 and the top 30. The air must flow around this water barrier 64 and will increase in speed as it passes through the small space 72 and through the top outlet port 74.

The air then passes through the outlet chamber 40 of the vacuum device 26 above the second water barrier 64. The velocity remains high in the final stage of passage past the impellers 42 and subsequently out the exhaust port 52. The second stage of the filtration process takes place in a secondary filtration means 54 which may be a conventional bag using a more conventional medium such as paper, nylon, cotton or any other man-made materials that work efficiently to collect fine dust particles. The bag 54, itself is part of this invention as it relates to the high cfm configuration. It is designed to be as large as possible without becoming too cumbersome and impractical in application. The large size allows more airflow and also allows for a greater length of usage before requiring cleaning or replacement.

Vacuum devices 26 of this invention with regards to the lower cfm and high water lift configuration will handle the collection of slurry that is created through the process of wet cutting of concrete because of the water filtration technology. Therefore, this is a great advancement of technology with regards to fine dust pickup. There are many other areas of usage. Among others, this technology may be used in metal sanding such as auto bodywork and/or wood sanding.

Although the invention has been described and illustrated in detail, it is to be clearly understood that the same is by way of illustration and example, and is not to be taken by way of limitation. The spirit and scope of the present invention are to be limited only by the terms of the appended claims.

The invention claimed is:

1. A vacuum cleaner having a container having a top and a first filtering system comprising an intake hose passing downwardly through a float device having a top surface and situated on a water surface, said float device having a first, lowermost, section which is a float which floats on top of the water and a second, uppermost, section which is a float screen capable of trapping water droplets passing over it, a first water barrier on the top thereof, and a second water barrier located above the float device and being a spaced distance below the top of the container wherein the parts of the vacuum cleaner are so arranged that when air and debris enter the water through the intake hose, most of the debris is immediately deposited in the water, air containing water droplets containing some entrapped debris exits the water, passes over the first section of the float device, passes over the float screen depositing debris into the float screen, passes around the first water barrier, rises to the top of the container, and passes around the second water barrier with a loss of water droplets with entrapped debris throughout the passage.

2. The vacuum cleaner of claim 1, wherein the relationship between the float device and the intake hose is such that the intake hose will terminate approximately three inches below the surface of the water.

3. The vacuum cleaner of claim 2, wherein the intake tube has an inside diameter of at least five inches.

4. The vacuum cleaner of claim 3, wherein the intake tube has an inner surface covered with a non-sticking coating.

5. The vacuum cleaner of claim 4, wherein the container has an exit port and there is a second filtering system comprising a filter bag outside the exit port.

6. A device for connecting a vacuum hose to the cover of a circular saw, which device has a top piece, a bottom piece, and a vacuum hose connector, the top piece being in a fixed position, the bottom piece being moveably connected to the top piece with slotted bolt holes that allow for the bottom piece to move relative to the top piece and to stay near the object to be cut at the time of operation, and the vacuum hose connector being low and to the rear of the bottom piece wherein the top piece and the bottom piece are so situated that the bottom piece overlaps with the top piece and when in use both the top piece and the bottom piece will be above the object to be cut.

* * * * *